United States Patent
Almubarak (10) Patent No.: US 12,252,647 B1
(45) Date of Patent: Mar. 18, 2025

(54) MEHODS OF USING PLANT EDIBLE DEMULSIFIER ADDITIVES COMPRISING CAPSAICINOID IN SUBTERRANEAN FORMATION TREATMENT FLUIDS, AND SYSTEMS RELATED THERETO

(71) Applicant: SAUDI ARABIAN OIL COMPANY, Dhahran (SA)

(72) Inventor: Tariq Abdulsattar Almubarak, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/492,576

(22) Filed: Oct. 23, 2023

(51) Int. Cl.
  *E21B 43/16* (2006.01)
  *C09K 8/60* (2006.01)
  *E21B 43/27* (2006.01)

(52) U.S. Cl.
  CPC .............. *C09K 8/60* (2013.01); *E21B 43/16* (2013.01); *E21B 43/27* (2020.05)

(58) Field of Classification Search
  CPC ............ C09K 8/60; E21B 43/27; E21B 43/16
  See application file for complete search history.

(56) References Cited

U.S. PATENT DOCUMENTS

| | | | | |
|---|---|---|---|---|
| 3,727,689 A | * | 4/1973 | Clampitt | C09K 8/685 |
| | | | | 507/903 |
| 2012/0080232 A1 | * | 4/2012 | Muller | E21B 33/14 |
| | | | | 175/57 |
| 2015/0038471 A1 | * | 2/2015 | Lee | C09K 8/04 |
| | | | | 507/237 |
| 2016/0222279 A1 | * | 8/2016 | Cassidy | C09K 8/54 |
| 2016/0244661 A1 | * | 8/2016 | Almubarak | C09K 8/845 |
| 2020/0002594 A1 | * | 1/2020 | Ray | E21B 37/06 |

OTHER PUBLICATIONS

Elif Akbas, U. Betul Soyler & Mecit Halil Oztop (2017) Capsaicin emulsions: Formulation and characterization, Journal of Dispersion Science and Technology, 38:8, 1079-1086.

Kuldeep Nigam, Reema Gabrani, Shweta Dang, Nano-emulsion from Capsaicin: Formulation and Characterization, Materials Today: Proceedings, vol. 18, Part 3, 2019, pp. 869-878.

Abdullah, M.M.S .; Al-Lohedan, H.A. Novel Bio-Based Amphiphilic Ionic Liquids for the Efficient Demulsification of Heavy Crude Oil Emulsions. Molecules 2021, 26, 6119.

(Continued)

*Primary Examiner* — Silvana C Runyan
(74) *Attorney, Agent, or Firm* — Vorys, Sater, Seymour and Pease, LLP (57) ABSTRACT

Methods including the steps of mixing a treatment fluid comprising: a base fluid; a strong acid; and a plant edible demulsifier (PED). Wherein the PED comprises a capsaicinoid extract at a wt % range of 0.5 wt % to 10 wt %, based on the total weight of the treatment fluid. And then pumping the treatment fluid into a wellbore drilled through a subterranean formation. Wherein the PED reduces or eliminates formation of an emulsion in the treatment fluid. Some methods take the further step of injecting the PED into a wellbore drilled through the subterranean formation. And systems using the PED.

13 Claims, 2 Drawing Sheets

(56) References Cited

OTHER PUBLICATIONS

Ayman M. Atta, Mahmood M.S. Abdullah, Hamad A. Al-Lohedan, Abdelrahman O. Ezzat, Demulsification of heavy crude oil using new nonionic cardanol surfactants, Journal of Molecular Liquids, vol. 252, 2018, pp. 311-320.

Vincent Enontiemonria Efeovbokhan, Joseph Denis Udonne, Ayodedji Adedeji Ayoola, Oluwadara Temitayo Shogbamu, Rasheed Babalola, A study of the effects of phenolic de-emulsifier solutions in xylene on the de-emulsification of a Nigerian crude oil emulsion, Journal of Applied Research and Technology, vol. 15, Issue 2, 2017, pp. 110-121.

Reza Zolfaghari, Ahmadun Fakhru'l-Razi, Luqman C. Abdullah, Said S.E.H. Elnashaie, Alireza Pendashteh, Demulsification techniques of water-in-oil and oil-in-water emulsions in petroleum industry, Separation and Purification Technology, vol. 170, 2016, pp. 377-407.

\* cited by examiner

MEHODS OF USING PLANT EDIBLE DEMULSIFIER ADDITIVES COMPRISING CAPSAICINOID IN SUBTERRANEAN FORMATION TREATMENT FLUIDS, AND SYSTEMS RELATED THERETO

FIELD OF INVENTION

The present disclosure relates generally to compositions, methods, and systems for use in the oil and gas industry, and more particularly, to compositions, methods, and systems related to subterranean formation treatment fluids comprising environmentally friendly demulsifier additives.

BACKGROUND

The production of crude oil and other hydrocarbons begins with the drilling of a wellbore through a subterranean formation and into a hydrocarbon reservoir. Drilling of a wellbore generally involves circulating a drilling treatment fluid (or mud) from a surface location of the wellbore to a downhole location through a drill string. The drilling treatment fluid exits through ports (or jets) in a drill bit, which bores through the formation and forms the wellbore. The drilling treatment fluid aids in cooling and lubricating the drill bit and further picks up cuttings and carries the cuttings up an annulus formed between an inner wall of the wellbore and an outer wall of the drill string. The drilling fluid and the cuttings flow through the annulus to the surface, where the cuttings are separated from the fluid.

The wellbore may be isolated from the surrounding subterranean formation using a completion cementing operation. During a cementing operation, a cement sheath is placed within a wellbore between the subterranean formation and a casing (or liner string). The cement sheath is formed by pumping a cement treatment fluid (or slurry) through the bottom of the casing and out through the annulus between the outer casing wall and the formation face of the wellbore. The cement treatment fluid then cures in the annular space, thereby forming a sheath of hardened cement that, among other functions, supports and positions the casing in the wellbore and bonds the exterior surface of the casing to the subterranean formation.

After drilling and completion operations have concluded in a subterranean formation, the wellbore may be stimulated using a stimulation operation (including enhanced oil recovery options) to produce and/or improve hydrocarbon productivity therethrough. During a stimulation operation, a stimulation treatment fluid may be used to induce hydrocarbon production, such as by fracturing the subterranean formation (e.g., hydraulic fracturing), acidizing the subterranean formation (e.g., to clean rock pores and increase permeability), flooding (e.g., water, chemical, or gas flooding) of the subterranean formation, and any combination thereof.

In each of the aforementioned subterranean formation operations, the various treatment fluids may comprise a strong acid (e.g., hydrochloric acid) for performing various purposes including, for example, to control pH, to treat contamination, to remove scale, to clean tubulars, to clean a wellbore surface, to increase subterranean formation porosity and permeability (e.g., matrix acidizing), and the like, and any combination thereof. However, strong acids can result in undesirable emulsion formation when used with incompatible treatment base fluids, ultimately resulting in formation damage that can impair the permeability and productivity of a wellbore. Accordingly, demulsifiers are included in treatment fluids comprising such strong acids to combat emulsion formation. Conventional demulsifiers are not environmentally friendly and, indeed, are often highly toxic. Moreover, newly proposed "green" demulsifiers are either still toxic or do not meet the requirements for use as a demulsifier in a treatment fluid for performing a subterranean formation operation.

In light of the aforementioned issues with conventional and proposed "green" demulsifiers, it is desirable to have improved demulsifiers to that are environmentally friendly, non-toxic, and effective for use in subterranean formation operations.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

In one or more aspects, the present disclosure provides a method including preparing a treatment fluid comprising: a base fluid; a strong acid; and a plant edible demulsifier (PED) comprising a capsaicinoid extract; and introducing the treatment fluid into a wellbore drilled through a subterranean formation, wherein the PED reduces or eliminates formation of an emulsion in the treatment fluid.

In another aspect, the present disclosure provides a method including preparing a treatment fluid comprising: a base fluid; and a strong acid; introducing the treatment fluid into a wellbore drilled through a subterranean formation, wherein at least a portion of the treatment fluid forms an emulsion; and introducing a plant edible demulsifier (PED) comprising a capsaicinoid extract to the treatment fluid in the wellbore drilled through the subterranean formation, wherein the PED reduces or eliminates the formed emulsion.

In yet another aspect, the present disclosure provides a system including a pump fluidly coupled to a tubular, the tubular extending into a wellbore drilled through a subterranean formation and containing a treatment fluid, the treatment fluid comprising: a base fluid; a strong acid; and a plant edible demulsifier (PED) comprising a capsaicinoid extract.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

The present disclosure relates generally to compositions, methods, and systems for use in the oil and gas industry, and more particularly, to compositions, methods, and systems related to subterranean formation treatment fluids comprising environmentally friendly demulsifier additives.

The present disclosure provides plant extract demulsifiers ("PEDs") for upstream subterranean formation operations in the oil and gas industry, including drilling operations, completion operations, and stimulation operations. The PEDs advantageously provide an environmentally friendly partial or total substitute for the use of otherwise environmentally harmful conventional demulsifiers when introducing treatment fluids comprising strong acids into a subterranean formation for hydrocarbon recovery. Indeed, the PEDs utilize edible plant material extracts that often are environmentally friendly and non-toxic. Advantageously, the PEDs described herein further are cost-effective, utilizing a readily available and renewable resource for their composition.

The PEDs of the present disclosure may be used in various upstream subterranean formation operations. Such subterranean formation operations may include any operation in which treatment fluids comprising a strong acid are used. Examples of upstream subterranean formation operations in which the PEDs of the present disclosure may be used in a treatment fluid comprising a strong acid may include, but are not limited to, a drilling operation, a cementing operation, a fracturing operation, an acid-fracturing operation, an acidizing operation, an enhanced oil recovery operation (e.g., a water, chemical, or gas flooding operation), and any combination thereof.

It is to be appreciated that while the current application primarily discusses the PEDs with reference to upstream oil and gas subterranean formation operations, the PEDs may additionally, and without limitation, be used in downstream applications. For example, the PEDs may be included in treatment fluids in oil refining to reduce or eliminate the formation of emulsions or separate formed emulsions.

Accordingly, the PEDs of the present disclosure offer an environmentally friendly, non-toxic partial or total substitute for the use of otherwise environmentally harmful conventional demulsifiers to combat the formation of emulsions or separate formed emulsions in treatment fluids comprising a strong acid.

Definitions

As used herein, the term "subterranean formation," and grammatical variants thereof, refers to naturally occurring rock beneath the Earth's surface, including subsea surfaces. Subterranean formations may be formed from a variety of natural rock including, but not limited to, carbonate-based rock (e.g., calcium carbonate ($CaCO_3$)), calcium magnesium carbonate ($CaMg(CO_3)_2$) (also referred to as dolomite), sandstone-based rock comprising clays (e.g., smectite, illite, kaolinite, chlorite, and the like) and minerals (e.g., silica) and the like, and any combination thereof. The subterranean formations described herein encompass reservoir zones (i.e., zones comprising hydrocarbons (oil and/or gas)) and non-reservoir zones (i.e., zones that do not comprise hydrocarbons, such as water-producing zones).

As used herein, the term "subterranean formation operation," and grammatical variants thereof, refers to any operation involved in the drilling, completion, and/or production of hydrocarbons in an oil and gas wellbore within a subterranean formation.

As used herein, the term "wellbore," and grammatical variants thereof, refers to a drilled hole or borehole penetrating a subterranean formation, which may be cased (cemented) on uncased (openhole).

As used herein, the term "treatment fluid," and grammatical variants thereof, refers generally to any fluid that may be used in a subterranean formation operation in conjunction with a desired function and/or purpose. In general, the treatment fluids comprising the PEDs described herein comprise one or more PEDs to combat formation of an emulsion or separate a formed emulsion in a treatment fluid comprising a strong acid.

As used herein, the term "base fluid," and grammatical variants thereof, refers to a major fluid component (e.g., liquid, gas, emulsion) of a treatment fluid, as opposed to various components dissolved or suspended therein.

As used herein, the term "strong acid," and grammatical variants thereof, refers to an acid having a pH of equal to or less than about 3.1 at 1 millimolar (mM) at 25° C. at 1 atmosphere (atm).

As used herein, the term "*Capsicum* genus," and grammatical variants thereof, refers to a genus of flowering plants in the nightshade family Solanaceae. The term "*Capsicum* genus" refers to all species within the *Capsicum* genus, without limitation.

As used herein, the term "*Capsicum* genus plant fruit," and grammatical variants thereof, refers to the fruiting portion of the plant, namely, the pepper of a plant in the *Capsicum* genus.

As used herein, the term "capsaicinoid," and grammatical variants thereof, are defined as various active constituents of *Capsicum* genus plant fruit, including natural and synthetic capsaicinoids.

As used herein, the term "solvent," and grammatical variants thereof, refers to a flowable (e.g., generally liquid) substance that is able to dissolve another substance, namely a capsaicinoid material from the *Capsicum* genus.

PED Treatment Fluids

As provided above, the PEDs of the present disclosure offer an environmentally friendly, non-toxic demulsifier that combats the formation of emulsions or separates formed emulsions in treatment fluids comprising a strong acid. The PEDs are formed by chemical extraction of edible plants belonging to the *Capsicum* genus.

In one or more embodiments, the PEDs are formed by solvent extraction of a capsaicinoid from a *Capsicum* genus plant. Plants in the *Capsicum* genus are well-known, common plants found throughout the world. Suitable *Capsicum* genus plants for use in solvent extraction of a capsaicinoid for use as the PEDs of the present disclosure may include, but are not limited to, *Capsicum annuum; Capsicum baccatum; Capsicum benoistii; Capsicum buforum; Capsicum caatingae; Capsicum caballeroi; Capsicum campylopodium; Capsicum carassense; Capsicum cardenasii; Capsicum ceratocalyx; Capsicum chacoense; Capsicum chinense; Capsicum coccineum; Capsicum cornutum; Capsicum dimorphum; Capsicum dusenii; Capsicum eshbaughii; Capsicum eximium; Capsicum flexuosum; Capsicum friburgense; Capsicum frutescens; Capsicum galapagoense; Capsicum geminifolium; Capsicum havanense; Capsicum*

*hookerianum; Capsicum hunzikerianum; Capsicum lanceolatum; Capsicum leptopodum; Capsicum longidentatum; Capsicum longifolium; Capsicum lycianthoides; Capsicum minutiflorum; Capsicum mirabile; Capsicum mositicum; Capsicum neei; Capsicum parvifolium; Capsicum pereirae; Capsicum pubescens; Capsicum piuranum; Capsicum praetermissum; Capsicum ramosissimum; Capsicum recurvatum; Capsicum regale; Capsicum rhomboideum; Capsicum schottianum; Capsicum scolnikianum; Capsicum spina-alba; Capsicum stramoniifolium; Capsicum tovarii; Capsicum villosum*; and any combination thereof.

In some embodiments, specific *Capsicum* genus plants for use in solvent extraction of a capsaicinoid for use as the PEDs of the present disclosure may include, but are not limited to, *Capsicum annuum, Capsicum frutescens, Capsicum chinense*, and any combination thereof. Common names for these *Capsicum* species include bell peppers, cayenne peppers, ghost peppers, Carolina Reaper peppers, and jalapeno peppers.

Capsaicinoids (natural or synthetic) are derived from *Capsicum* genus plant fruits (i.e., the peppers) and are active constitutes thereof that are safe for human consumption (non-toxic) and have been used in cooking applications, in dietary supplements (e.g., improving metabolic activity), in topical pain relief creams, as anti-fouling coatings against bacteria, as repellents for rodent and bug control, as pepper spray utilized by law enforcement, to name a few. Capsaicinoids (natural and synthetic) are identified as "GRAS" (Generally Recognized as Safe) by the U.S. Food and Drug Administration.

Capsaicinoids generally comprise an aromatic ring with a long hydrophobic chain and a polar amide group. The general structure of a capsaicinoid is provided below:

where the aromatic ring may be a vanillyl group, Me is a methyl group, and $R_1$ is a hydrophobic chain length having from 3 to 20 carbons. The hydrophobic chain length may include branching and saturated double bonds.

Specific examples of natural capsaicinoids that may be solvent extracted from *Capsicum* genus plant fruits for use in forming the PEDs of the present disclosure include, but are not limited to, capsaicin ((6E)-N-[(4-Hydroxy-3-methoxyphenyl)methyl]-8-methylnon-6-enamide), norocapsasin ((E)-N-[(4-hydroxy-3-methoxyphenyl)methyl]-7-methyloct-5-enamide), nordihydrocapsaicin (N-[(4-Hydroxy-3-methoxyphenyl)methyl]-7-methyloctanamide), homocapsaicin ((6E)-N-(4-Hydroxy-3-methoxybenzyl)-8-methyldec-6-enamide), homodihydrocapsaicin (N-[(4-Hydroxy-3-methoxyphenyl)methyl]-9-methyldecanamide), dihydrocapsaicin (N-[(4-Hydroxy-3-methoxyphenyl)methyl]-8-methylnonanamide), and any combination thereof.

It is to be appreciated that synthetic capsaicinoids may additionally be used as PEDs for forming the treatment fluids described herein, without departing from the present disclosure. Synthetic capsaicinoids contain similar functional groups and function similarly to natural capsaicinoids. Examples of such synthetic capsaicinoids may include, but are not limited to nonivamide (N-[(4-hydroxy-3-methoxyphenyl)methyl]nonanamide), PAVA (pelargonic acid vanillylamide), and any combination thereof.

The PEDs described herein may be formed by solvent extraction of a *Capsicum* genus plant fruit to form a capsaicinoid extract. Prior to extraction, the *Capsicum* genus plant fruit may be ground or otherwise pulverized, such as to a fine powder to facilitate solvent extraction. The grinding (or pulverization or maceration) may occur after drying at room temperature, drying at temperatures above room temperature (e.g., in an oven), freeze-drying, dehydration drying, and the like, and any combination thereof. It is to be appreciated that the *Capsicum* genus plant fruit may be submerged in a solvent for a period of time at room temperature or above without grinding or pulverization, without departing from the scope of the present disclosure.

The solvent for use in deriving the capsaicinoid extract forming the PEDs described herein may include an organic-based solvent. Examples of suitable organic-based solvents include, but are not limited to, ethanol, methanol, acetone, isotone, isopropyl alcohol, dichloromethane, benzene, toluene, acetic acid, ethyl acetate, dimethyl sulfoxide (DMSO), dimethyl formamide, acetonitrile, ethyl ether, petroleum ether, and the like, and any combination thereof.

In some embodiments, the solvent has a purity of equal to or greater than about 90%, or preferably equal to or greater than about 95%, or about 70% to about 100%, encompassing any value and subset therebetween, such as about 70% to about 71%, or about 71% to about 72%, or about 72% to about 73%, or about 73% to about 74%, or about 74% to about 75%, or about 75% to about 76%, or about 76% to about 77%, or about 77% to about 78%, or about 78% to about 79%, or about 79% to about 80%, or about 80% to about 81%, or about 81% to about 82%, or about 82% to about 83%, or about 83% to about 84%, or about 84% to about 85%, or about 85% to about 86%, or about 86% to about 87%, or about 87% to about 88%, or about 88% to about 89%, or about 89% to about 90%, or about 90% to about 91%, or about 91% to about 92%, or about 92% to about 93%, or about 93% to about 94%, or about 94% to about 95%, or about 95% to about 96%, or about 96% to about 97%, or about 97% to about 98%, or about 98% to about 99%, or about 99% to about 100%, or about 90% to about 95%, or about 95% to about 100%, or about 96% to about 100%, or about 97% to about 100%, or about 98% to about 100%.

In one or more aspects of the present disclosure, the extraction occurs in the presence of one or more selected solvents via an extraction process including mechanical extraction (e.g., mechanical pressing, grinding, or other applied force), percolation extraction (e.g., continual application of fresh solvent), supercritical fluid extraction (e.g., use of a supercritical solvent), soaking extraction (e.g., prolonged emersion, temperature expedited emersion, and the like), Soxhlet extraction, and the like, and any combination thereof.

Additional mechanical equipment may be used in combination with the extraction method selected to facilitate cellulose extraction. Such equipment may include, but is not limited to, glass boiling chips, agitation devices (e.g., stirrer, shaker), and the like, and any combination thereof.

The selected extraction method(s) may be repeated without limitation to achieve the desired concentration of capsaicinoid extract for use in a treatment fluid, as described herein. For example, the extraction method may be repeated through several flushes over several days.

As provided herein, the PEDs of the present disclosure may be included in a treatment fluid to facilitate performance of a subterranean formation operation. The treatment fluid may comprise a base fluid, PDAs, a strong acid, and one or more optional additives.

The base fluid may include, but is not limited to, an aqueous base fluid, an aqueous-miscible base fluid, an oil base fluid, and any combination thereof.

Suitable aqueous base fluids may include, but are not limited to, fresh water, saltwater, brine, seawater, wastewater, purified wastewater, and the like, and any combination thereof.

Examples of suitable aqueous-miscible base fluids may include, but are not limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts, and any combination thereof.

Examples of suitable oil base fluids may include, but are not limited to, alkanes, olefins, aromatic organic compounds, xylenes, cyclic alkanes, paraffins, diesel fluids, mineral oils, desulfurized hydrogenated kerosenes, and any combination thereof.

The treatment fluids of the present disclosure comprise the PEDs prepared as described herein. The particular PEDs selected (i.e., the particular one or more *Capsicum* genus plant fruits selected) may depend on a number of factors including, but not limited to, the acid included in the treatment fluid (e.g., straight acid, emulsified acid, viscoelastic acid), the particular subterranean formation operation to be performed, and the like, and any combination thereof. In one or more instances, the PEDs may be included in the treatment fluids of the present disclosure in an amount in the range of about 0.1 percent by weight (wt %) to about 10 wt % of the treatment fluid, encompassing any value and subset therebetween, such as in the range of about 0.1 wt % to about 1 wt %, or about 1 wt % to about 2 wt %, or about 2 wt % to about 3 wt %, or about 3 wt % to about 4 wt %, or about 4 wt % to about 5 wt %, or about 5 wt % to about 6 wt %, or about 6 wt % to about 7 wt %, or about 7 wt % to about 8 wt %, or about 8 wt % to about 9 wt %, or about 9 wt % to about 10 wt %.

The treatment fluids of the present disclosure may comprise a strong acid, such as for performing an acid-fracturing, acidizing, or asphaltene removal subterranean formation operation, or for other subterranean formation operations where it is beneficial to include an acid. Generally, the PEDs are soluble or readily dispersible within the acid. The PEDs may be dispersed in acid via the addition of a dispersion aid. This may enable the PEDs to stay suspended in the acid. The PEDs may be combined with a solvent such as one or more alcohols. Then this solution may be added to the treatment fluid or the acid.

As provided above, the strong acid for use in the treatment fluids of the present disclosure have a pH of less than 3.1, or in the range of about 0 to about 3.1, encompassing any value and subset therebetween, such as in the range of about 0 to about 1, or about 1 to about 2, or about 2 to about 3.1, or about 1 to about 3.1, or about 0 to about 2.

The strong acids for use in the treatment fluids may include, but are not limited to, hydrochloric acid (HCl), orthophosphoric acid ($H_3PO_4$), nitric acid ($HNO_3$), sulfuric acid ($H_2SO_4$), selenic acid ($H_2SeO_4$), hydroiodic acid (HI), arsenic acid ($H_3AsO_4$), chromic acid ($H_2CrO_4$), and the like, and any combination thereof. The particular strong acid or acids selected for use in a treatment fluid comprising the PEDs described herein may depend on a number of factors including, but not limited to, the particular base fluid (e.g., compatibility with an oil base fluid or other base fluid type), the particular subterranean formation operation to be performed, and the like, and any combination thereof.

In one or more embodiments, the strong acid may be included in the treatment fluids of the present disclosure in an amount in the range of about 1 wt % to about 28 wt % of the treatment fluid, encompassing any value and subset therebetween, 1 wt % to about 4 wt %, or about 4 wt % to about 8 wt %, or about 8 wt % to about 12 wt %, or about 12 wt % to about 16 wt %, or about 16 wt % to about 20 wt %, or about 20 wt % to about 24 wt %, or about 24 wt % to about 28 wt %, or about 14 wt % to about 16 wt %, or about 15 wt %.

In one or more instances, the treatment fluids of the present disclosure may further comprise one or more additives. Such additives may include, but are not limited to, a salt, an inert solid, a fluid loss control agent, a dispersion aid, a corrosion inhibitor, an emulsifier, an emulsion thinner, an emulsion thickener, a viscosifying agent, a gelling agent, a surfactant, a particulate, a proppant, a gravel particulate, a lost circulation material, a foaming agent, a gas, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, an oxygen scavenger, a hydrogen sulfide scavenger, an anti-sludge agent, an iron control agent, a demulsifier (conventional), and any combination thereof.

Systems and Methods

In various embodiments, systems configured for performing the method of delivering the treatment fluids comprising the PEDs described herein to a downhole location within a subterranean formation are provided. In various embodiments, the systems can comprise a pump fluidly coupled to a tubular, the tubular containing the treatment fluids described herein.

The pump may be a high pressure pump in some embodiments. As used herein, the term "high pressure pump," and grammatical variants thereof, refers to a pump that is capable of delivering the treatment fluids downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying solid particulate matter, such as the solid waste plastics and other solid additives described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump," and grammatical variants thereof, refers to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

Figure 1:
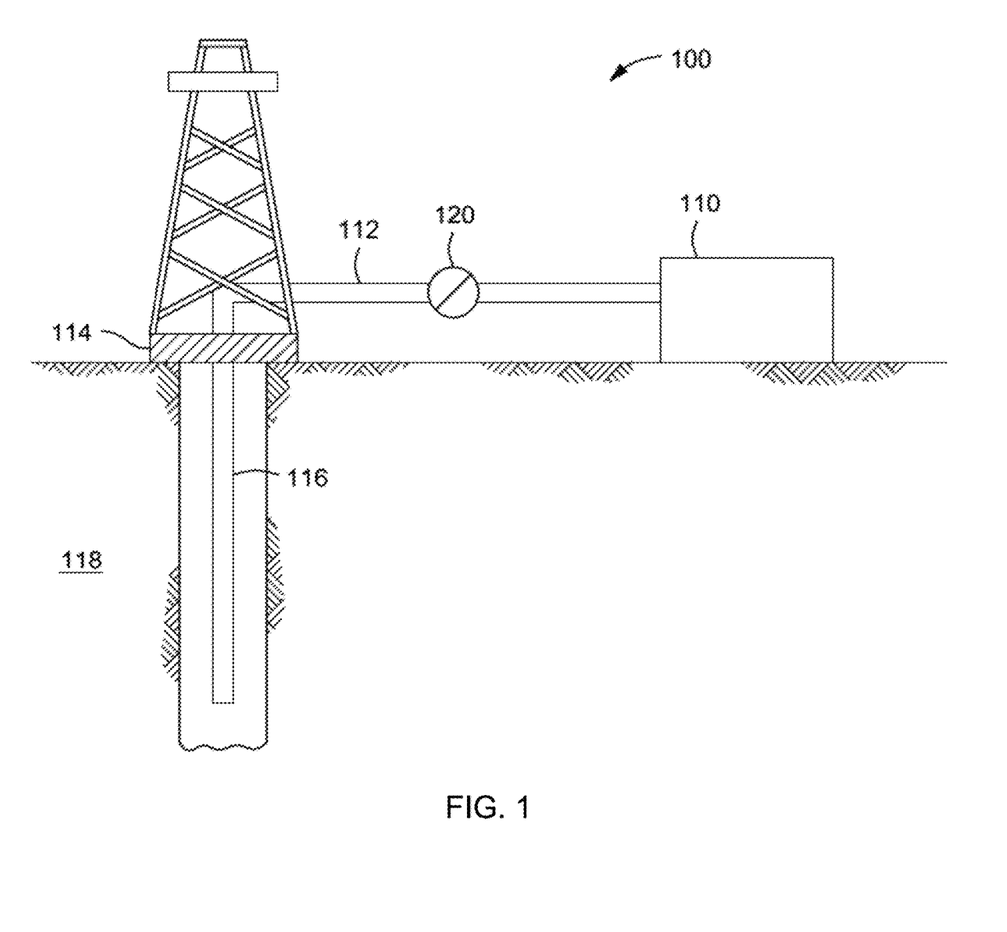
FIG. 1 is a schematic drawing of a system that can deliver the treatment fluids comprising the plant edible demulsifiers described herein to a subterranean (downhole) location, according to one or more aspects of the present disclosure.

FIG. 1 shows an illustrative schematic of a system that can deliver the treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 100 may include mixing tank 110, in which the treatment fluids of the embodiments herein may be formulated. The treatment fluids may be conveyed via line 112 to wellhead 114, where the treatment fluids enter tubular 116, tubular 116 extending from wellhead 114 into subterranean formation 118. Upon being ejected from tubular 116, the treatment fluids may subsequently penetrate into subterranean formation 118. Pump 120 may be configured to raise the pressure of the treatment fluids to a desired degree before introduction into tubular 116. It is to be recognized that system 100 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

In one or more embodiments, delivery of the treatment fluids described herein to a downhole location may be initially performed with or without the PEDs included. For example, the PEDs may be incorporated (delivered to the downhole location) after the other components of the treatment fluid have been introduced and have formed an emulsion. The incorporated PEDs can thus separate the emulsion.

While various embodiments have been shown and described herein, modifications may be made by one skilled in the art without departing from the scope of the present disclosure. The embodiments described here are exemplary only, and are not intended to be limiting. Many variations, combinations, and modifications of the embodiments disclosed herein are possible and are within the scope of the disclosure. Accordingly, the scope of protection is not limited by the description set out above, but is defined by the claims which follow, that scope including all equivalents of the subject matter of the claims.

Non-Limiting Example Embodiments

Embodiments disclosed herein include:

Embodiment A: A method comprising: preparing a treatment fluid comprising: a base fluid; a strong acid; and a plant edible demulsifier (PED) comprising a capsaicinoid extract; and introducing the treatment fluid into a wellbore drilled through a subterranean formation, wherein the PED reduces or eliminates formation of an emulsion in the treatment fluid.

Embodiment B: A method comprising: preparing a treatment fluid comprising: a base fluid; and a strong acid; introducing the treatment fluid into a wellbore drilled through a subterranean formation, wherein at least a portion of the treatment fluid forms an emulsion; and introducing a plant edible demulsifier (PED) comprising a capsaicinoid extract to the treatment fluid in the wellbore drilled through the subterranean formation, wherein the PED reduces or eliminates the formed emulsion.

Embodiment C: A system comprising: a pump fluidly coupled to a tubular, the tubular extending into a wellbore drilled through a subterranean formation and containing a treatment fluid, the treatment fluid comprising: a base fluid; a strong acid; and a plant edible demulsifier (PED) comprising a capsaicinoid extract.

Each of embodiments A, B, and C may have one or more of the following additional elements in any combination:

Element 1: wherein the capsaicinoid extract is a natural capsaicinoid extract selected from the group consisting of capsaicin, norocapsasin, nordihydrocapsaicin, homocapsaicin, homodihydrocapsaicin, dihydrocapsaicin, and any combination thereof.

Element 2: wherein the capsaicinoid extract is a synthetic capsaicinoid extract selected from the group consisting of nonivamide, pelargonic acid vanillylamide, and any combination thereof.

Element 3: wherein the PED is present in the treatment fluid in the range of about 0.1 wt % to about 10 wt %.

Element 4: wherein the strong acid has a pH in the range of 0 to about 3.1.

Element 5: wherein the strong acid is selected from the group consisting of hydrochloric acid, orthophosphoric acid, nitric acid, sulfuric acid, selenic acid, hydroiodic acid, arsenic acid, chromic acid, and any combination thereof.

Element 6: wherein the strong acid is present in the treatment fluid in the range of about 1 wt % to about 28 wt %.

Element 7: further comprising preparing the capsaicinoid extract by contacting a *Capsicum* genus plant fruit with a solvent.

Element 8: further comprising preparing the capsaicinoid extract by contacting a *Capsicum* genus plant fruit with a solvent and wherein the *Capsicum* genus plant fruit is selected from a species group consisting of *Capsicum annuum, Capsicum frutescens, Capsicum chinense*, and any combination thereof.

Element 9: further comprising preparing the capsaicinoid extract by contacting a *Capsicum* genus plant fruit with a solvent and wherein the solvent is selected from the group consisting of ethanol, methanol, acetone, isotone, isopropyl alcohol, dichloromethane, benzene, toluene, acetic acid, ethyl acetate, dimethyl sulfoxide (DMSO), dimethyl formamide, acetonitrile, ethyl ether, petroleum ether, and any combination thereof.

By way of non-limiting example, exemplary combinations applicable to A, B, and C may include, but are not limited to: any one, more, or all of Elements 1-9 in any combination.

To facilitate a better understanding of the aspects of the present disclosure, the following examples of preferred or representative aspects are given. In no way should the following examples be read to limit, or to define, the scope of the disclosure.

EXAMPLES

Figure 2A:
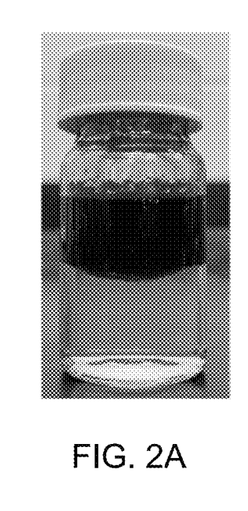
FIGS. 2a-2c provide photographic images of emulsion formation of a control treatment fluid comprising an oil base fluid and an acid.
Figure 2B:
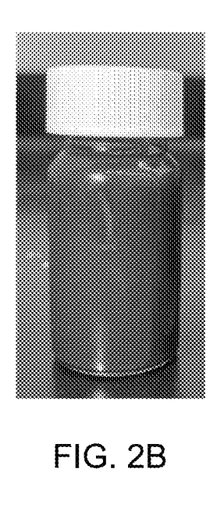
Figure 2C:
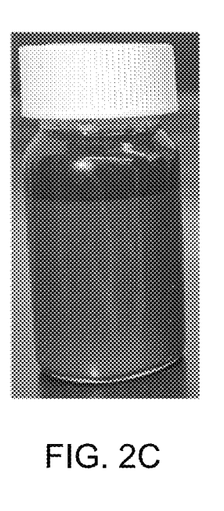

EXAMPLE 1: In this Example, emulsion formation of a control sample of 10 milliliters (mL) of 15 wt % HCl (acid) and 10 mL of Alaska crude oil (oil base fluid) was evaluated. FIG. 2*a* is a photograph showing the initial addition of the acid and oil base fluid. As shown, the oil is floating upon the acid. FIG. 2*b* shows the same composition after vigorous shaking, resulting in 100% of the composition forming a homogenous emulsion. Thereafter, as shown in FIG. 2c, the same composition was allowed to stand still for 20 minutes, resulting in only minor separation between the acid and oil base fluid. As provided in FIG. 2c, about 80% of the composition remained as a homogenous emulsion.

Figure 3:
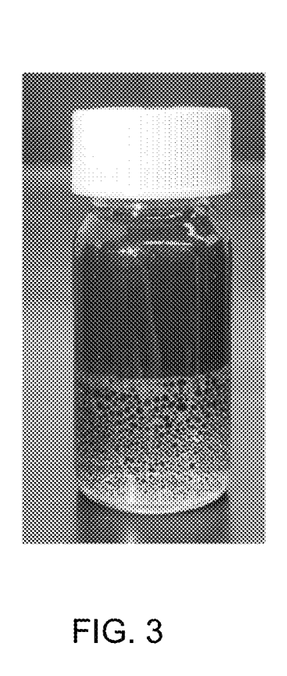
FIG. 3 provides a photographic image of emulsion separation of an emulsified treatment fluid comprising an oil base fluid and a strong acid using a natural PED according to the present disclosure.

EXAMPLE 2: In this Example, 2 wt % of pure (99.99%) natural capsaicin crystals was added to a composition prepared according to FIG. 2c. The emulsion instantaneously separated (demulsified) nearly 100%, as shown in FIG. 3. Accordingly, it is apparent that addition of a natural capsaicinoid can separate a formed emulsion in a treatment fluid comprising a base fluid and an acid.

Figure 4:
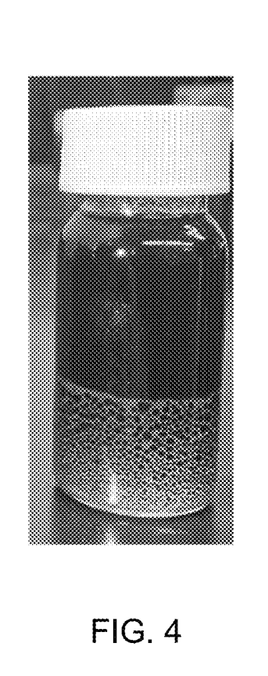
FIG. 4 provides a photographic image of emulsion separation of an emulsified treatment fluid comprising an oil base fluid and a strong acid using a synthetic PED according to the present disclosure.

EXAMPLE 3: In this Example, 2 wt % of pure (99.99%) synthetic nonivamide crystals was added to a composition prepared according to FIG. 2c. The emulsion instantaneously separated (demulsified) nearly 100%, as shown in FIG. 4. Accordingly, it is apparent that addition of a synthetic capsaicinoid can separate a formed emulsion in a treatment fluid comprising a base fluid and an acid.

Accordingly, the present disclosure provides for PEDs for use in treatment fluids comprising a strong acid to reduce or eliminate the formation of emulsions or separate formed emulsions.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains," "containing," "includes," "including," "comprises," and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized that these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and are not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

What is claimed is:

1. A method comprising:
   mixing a treatment fluid comprising:
   a base fluid;
   a strong acid; and
   a plant edible demulsifier (PED) comprising a capsaicinoid extract at a wt % range of 0.5 wt % to 10 wt %, based on the total weight of the treatment fluid; and
   pumping the treatment fluid into a wellbore drilled through a subterranean formation, wherein the PED reduces or eliminates formation of an emulsion in the treatment fluid.

2. The method of claim 1, wherein the capsaicinoid extract is a natural capsaicinoid extract selected from the group consisting of capsaicin, norocapsasin, nordihydrocapsaicin, homocapsaicin, homodihydrocapsaicin, dihydrocapsaicin, and any combination thereof.

3. The method of claim 1, wherein the capsaicinoid extract is a synthetic capsaicinoid extract selected from the group consisting of nonivamide, pelargonic acid vanillylamide, and any combination thereof.

4. The method of claim 1, wherein the strong acid has a pH in the range of 0 to about 3.1.

5. The method of claim 1, wherein the strong acid is selected from the group consisting of hydrochloric acid, orthophosphoric acid, nitric acid, sulfuric acid, selenic acid, hydroiodic acid, arsenic acid, chromic acid, and any combination thereof.

6. The method of claim 1, wherein the strong acid is present in the treatment fluid in a wt % range of 1 wt % to 28 wt %.

7. The method of claim 1, further comprising preparing the capsaicinoid extract by contacting a *Capsicum* genus plant fruit with a solvent.

8. The method of claim 7, wherein the *Capsicum* genus plant fruit is selected from a species group consisting of *Capsicum annuum, Capsicum frutescens, Capsicum chinense*, and any combination thereof.

9. The method of claim 7, wherein the solvent is selected from the group consisting of ethanol, methanol, acetone, isotone, isopropyl alcohol, dichloromethane, benzene, toluene, acetic acid, ethyl acetate, dimethyl sulfoxide (DMSO), dimethyl formamide, acetonitrile, ethyl ether, petroleum ether, and any combination thereof.

10. A method comprising:
    mixing a treatment fluid comprising:
        a base fluid; and
        a strong acid;
    pumping the treatment fluid into a wellbore drilled through a subterranean formation, wherein at least a portion of the treatment fluid forms an emulsion; and
    injecting a plant edible demulsifier (PED) comprising a capsaicinoid extract to the treatment fluid in the wellbore drilled through the subterranean formation,
        wherein the capsaicinoid extract is at a wt % range of 0.5 wt % to 10 wt %, based on the total weight of the treatment fluid; and,
        wherein the capsaicinoid extract is (1) a natural capsaicinoid extract selected from the group consisting of capsaicin, norocapsasin, nordihydrocapsaicin, homocapsaicin, homodihydrocapsaicin, dihydrocapsaicin, and any combination thereof, or (2) wherein the capsaicinoid extract is a synthetic capsaicinoid extract selected from the group consisting of nonivamide, pelargonic acid vanillylamide, and any combination thereof, and,
        wherein the PED reduces or eliminates the formed emulsion.

11. The method of claim 10, wherein the strong acid has a pH in the range of 0 to about 3.1.

12. The method of claim 10, wherein the strong acid is selected from the group consisting of hydrochloric acid, orthophosphoric acid, nitric acid, sulfuric acid, selenic acid, hydroiodic acid, arsenic acid, chromic acid, and any combination thereof.

13. The method of claim 10, wherein the strong acid is present in the treatment fluid in a wt % range of 1 wt % to 28 wt %.

* * * * *